United States Patent [19]

Bressan et al.

[11] Patent Number: 5,149,735

[45] Date of Patent: Sep. 22, 1992

[54] SELF-EXTINGUISHING POLYMERIC COMPOSITIONS

[75] Inventors: Giancarlo Bressan; Claudio Troglia; Corrado Brichta, all of Milan; Giancarlo Barbero, Arona, all of Italy

[73] Assignee: Enimont Augusta Industriale S.R.L., Milan, Italy

[21] Appl. No.: 607,321

[22] Filed: Oct. 31, 1990

[30] Foreign Application Priority Data

Nov. 6, 1989 [IT] Italy .................. 22274 A/89

[51] Int. Cl.$^5$ .................. C08J 5/10; C08K 3/34; C08L 23/00
[52] U.S. Cl. .................. 524/450; 524/416
[58] Field of Search .................. 524/450, 416

[56] References Cited

U.S. PATENT DOCUMENTS

| | | | |
|---|---|---|---|
| 4,410,648 | 10/1983 | Kato et al. | 524/416 |
| 4,888,378 | 12/1989 | Kostinko | 524/450 |
| 4,938,958 | 7/1990 | Niira et al. | 524/450 |

FOREIGN PATENT DOCUMENTS 0138030 10/1979 Japan .................. 524/450

*Primary Examiner*—Paul R. Michl
*Assistant Examiner*—U. K. Rajguru
*Attorney, Agent, or Firm*—Morgan & Finnegan

[57] ABSTRACT

Self-extinguishing polymeric compositions are taught comprising, expressed in % by weight referrred to the total composition:

a) from 1 to 25% of at least an organic aliphatic, cycloaliphatic, aromatic halogen-derivative;
b) from 10 to 40% of at least an adduct between an inorganic halide and a zeolite;
c) from 0.5 to 5% of an organic reactive agent capable of modifying the polymeric matrix at the combustion temperature, comprising at least an organic compound which generates radicals at said temperature and at least a cross-linking agent;
d) the remaining part being composed of at least a thermoplastic polymer and/or copolymer.

21 Claims, No Drawings

SELF-EXTINGUISHING POLYMERIC COMPOSITIONS

FIELD OF THE INVENTION

The present invention relates to self-extinguishing polymeric compositions based on halogen-derivatives and halogenated adducts of zeolites.

More precisely, the invention relates to formulations for self-extinguishing polymeric compositions comprising organic halogen-derivatives and adducts between zeolites and inorganic halides having a synergistic action with the former, associated with a particular activating reactive organic system, capable of modifying the polymeric structure at the pyrolysis temperature.

BACKGROUND OF THE INVENTION

There are known self-extinguishing polymeric compositions wherein the retarding component consists of organo-brominated compounds synergistically associated with antimony derivatives, bismuth derivatives or tungsten derivatives (see R. Gächter et al "Plastics Additives Handbook"—Hanser Pub.—Munich, pages 539-541 (1987)).

Nevertheless, particularly in the case of antimony, which, besides, is the most broadly used component, there are some problems to be solved, in particular as regards the availability and the costs and, from the technical-application viewpoint, a not always satisfactory dispersibility in the polymeric mass, and the toxicity.

The present invention offers an alternative solution as it permits a substitution of the antimony derivative or of an equivalent derivative, the global retarding effectiveness being substantially equal or even improved.

On the other hand it is known to use zeolites or molecular sieves (see Jpn. patent applications Kokai Tokkyo Koho JP 63/92661 and Kokai Tokkyo Koho JP 63/170440), however not associated with other components of the self-extinguishing system, in order to impart to the articles a higher thermal stability and a more effective control of the flue gas emission during combustion. The present invention differentiates owing to the presence of a synergistic effect between zeolite and organic halogen-derivative (bromo-derivative) and owing to the presence of a modifier of the polymeric structure at the pyrolysis temperature.

U.S. Pat. No. 4,070,315 describes, for the ABS resins, an additive based on halogen-derivatives and magnesian bentonite, the latter having a synergistic action in the place of antimony. However, this solution is conceptually different from the one disclosed in the present invention since the bentonite has a chemico-physical nature substantially different from the one of the zeolites and furthermore it is not modified and/or associated with other substances; moreover, the cited patent lacks the concurrence of the polymeric structure modifying system, which is an essential part of the present invention, as better defined hereinafter.

The association of molecular sieves with organic halogenated flame retardants for SBR rubbers is the object of German patent DD 242618, where the following advantages are specified: stability during processing of the formulations and achievement of a higher retardant concentration. Also in this case no synergic effects are cited; neither is use made of organic activating reactive systems acting as modifiers of the polymeric structure at the pyrolysis temperature. U.S. Pat. No. 3,829,400 describes the use of calcium, zinc and magnesium bromides for the external fire-proof treatment of polyamide fibers. However it is not known that inorganic halopolyamide ides have been recommended as components of thermoplastic polymeric formulations with a specific antiflame function. Even the introduction of inorganic halides into such formulations encounters serious hindrances due to a difficult dispersion. However, neither associations of inorganic halides with substrates suited to allow the dispersion in polymeric masses are described in the prior art.

Last, U.S. Pat. Nos. 3,441,524 and 3,420,786 illustrate the use of radicals-generating activators, for example of the type described in U.S. Pat. No. 4,666,947, in combination with organic bromo-derivatives, in order to impart flame-retarding properties to styrene polymers. In this case, a viscosity decrease and a consequent dripping effect can be observed.

Nevertheless it is not described the association of such radical activators with cross-linking compounds, according to the present invention, in order to give rise to a contrary behaviour, namely to an increase in the viscosity of the polymeric matrix and to the subsequent formation of a cross-linking mass which, thanks to an intimate connection with the zeolitic substrate, represents a surprising flame-extinguishing effect, which is superior to the one obtained by pyrolytic dripping.

Thus, it is an object of the present invention to provide self-extinguishing polymeric compositions, based on organic halogen-derivatives and on adducts of zeolites modified with inorganic halides, which are free from the drawbacks discussed hereinabove in connection with the prior art.

Another object consists in providing compositions which are substantially free from components based on antimony, bismuth, tungsten and/or based on aromatic halogen-derivatives etc., which are potentially toxic. Conversely, there are used more reactive halogen-derivatives, such as hexabromo-cyclododecane, which do not involve potential toxic effects due to the formation of dioxines or of furans during combustion, especially in the presence of antimony.

Still a further object is to provide an antiflame system for self-extinguishing polymeric compositions, which is capable of securing a high antiflame activity in all the main polymer types (polyolefins, polyesters, polyamides, etc.) differently from the known antiflame systems which selectively exert their effective action with respect to one polymer class or to few polymer classes.

Lastly, a further object is to provide self-extinguishing compositions without dripping phenomena at the pyrolysis temperature.

SUMMARY OF THE INVENTION

These and still other objects, which will be more clearly apparent to a technician skilled in the art from the following description, are achieved, according to the present invention, by self-extinguishing polymeric compositions substantially comprising, expressed in per cent by weight calculated on the total self-extinguishing polymeric composition:

a) from 1 to 25% of at least an organic aliphatic, cycloaliphatic, aromatic halogen-derivative;

b) from 10 to 40% of at least an adduct between an inorganic halide and a zeolite;

c) from 0.5 to 5% of an organic reactive modifier of the polymeric matrix at the combustion temperature, comprising at least an organic compound capable of giving rise to radicals at said temperature and at least a cross-linking agent;

d) the remaining part being composed of at least a thermoplastic polymer and/or copolymer.

In fact, a synergic effect has been surprisingly found between the organic halogen-derivatives defined under a) and the adducts between zeolites and inorganic halides as defined under para. b), activated by the presence of reactive component c) acting as a modifier of the polymeric matrix.

DESCRIPTION OF THE INVENTION

In particular, component a) can be selected from the organic bromo-derivatives not containing diaryloxyl groups such as, for example, hexabromo-cyclododecane, tetrabromophthalic anhydride, tetrabromobisphenol, polybromostyrene, hexabromobenzene, paraffinic chloroderivatives, melamine hydrobromide, bis-(dibromopropylether) of tetrabromobisphenol A and mixtures thereof.

Failing antimony it is possible to use also halogenated derivatives of diphenyloxide or mixtures thereof such as pentabromo-, octabromo-, decabromo-diphenyloxide, and chlorobromo-diphenyloxides or mixtures thereof with the preceding compounds. Preferred compounds are hexabromo-cyclododecane, melamine-hydrobromide and brominated polystyrene.

Preferably, component a) is present in an amount approximately ranging from 10 to 15% by weight referred to 100 parts by weight of the total self-extinguishing polymeric composition.

Component b) is a product obtained by interaction of a zeolite with an inorganic halide in hot solution or in the molten state. Various authors (N. Petranovic, M. Susic, J. C. S. Faraday I. 1979, 75, 2083) have described preparations of this type, generally obtained from inorganic salts and zeolites, having the nature of inclusion compounds resulting from the penetration of the salt molecules into the structural cavities of the zeolites. Useful zeolites are the synthetic or natural zeolites selected from the following ones:

1) synthetic zeolites of type A, corresponding to formula: $Na_2O \cdot Al_2O_3 \cdot 2SiO_2 \cdot 4,5H_2O$, typical of zeolite 4A, where cation Na+ can be substituted also partially by cations K+ (zeolite 3A) and Ca++ (zeolite 5A);

2) synthetic zeolites of type X, corresponding to the typical formula:

$$Na_2O \cdot Al_2O_3 \cdot 2,4\ SiO_2 \cdot 6H_2O;$$

3) synthetic zeolites of type Y, corresponding to the typical formula:

$$Na_2O \cdot Al_2O_3 \cdot 4,8\ SiO_2 \cdot 8,9H_2O;$$

4) hydroxy-sodalite corresponding to formula:

$$Na_2O \cdot Al_2O_3 \cdot 2SiO_2 \cdot 2,5H_2O;$$

5) natural zeolites mainly of the type: phillipsite, clinoptylolite, mordenite, chabazite and mixtures thereof.

In the abovesaid synthetic zeolites A, X and Y, the sodium cation can be substituted also partially by at least a cation selected from K+, Ca++, Mg++, Ba++, Zn++, Fe++.

For the zeolite classification, reference is made to patent No. EP-A-84115095.6.

Of course it is possible to use mixtures of the abovesaid zeolites. Lastly, it is possible to utilize also synthetic molecular sieves having zeolitic structure such as, for example, aluminophosphates and boroaluminosilicates.

The zeolite shall have a suitable granulometry in order that the adduct may be corresponding to the granulometric characteristics, which are indispensable for its perfect dispersion in the polymer: at least about 80% by weight of the zeolite shall consists of particles having sizes below 15 microns and preferably below 10 microns (determined according to the "Coulter counter" method).

As mentioned hereinbefore, component b) consists of a product of the interaction of the zeolite or molecular sieve having zeolitic structure with an inorganic halide.

The inorganic halide can be selected from the bromides and chlorides of alkaline metals and of alkaline earth metals; calcium and magnesium bromides are preferably used.

In the preparation of component b), depending on the reaction conditions and, in particular, on the reaction temperature, there is a partial or total removal of the zeolite constitution water and of the water introduced with the halide; therefore, a range of final compositions of the following type is obtained:

zeolite: 30–95% (preferably 65–90%),
inorganic halide: 5–60% (preferably 10–20%),
water: 0–30%, with respect to the adduct.

As already mentioned, a synergic effect between the described adducts and the organic bromo-derivative was observed. It is assumed that such synergism can be related to a particular thermal decomposition process of the inclusion complexes of the zeolites with inorganic salts.

However, this invention is not to be considered as bound to this or to another explicative theory of the observed synergic effect.

The adduct component b) defined hereinbefore is preferably utilized in an amount approximately ranging from 20 to by weight referred to 100 parts by weight of total polymeric composition.

Component c) can be defined as a reactive organic system or agent, which modifies the polymeric matrix at the combustion temperature and is substantially composed of:

1. at least a compound capable of generating radicals endowed with long semiconversion times—as better defined hereinafter—at a temperature higher than 250° C. and in any case at the combustion temperature of the self-extinguishing composition, associated with 2. at least a cross-linking agent capable of giving rise to a densely cross-linked organic structure connected with the zeolitic component. In this way, a polymer dripping during pyrolysis is prevented.

Organic radical-generating compounds in the sense defined above are the polysubstituted derivatives of diphenylethane described in U.S. Pat. No. 4,666,947 and the silylbenzopinacol derivatives described in EP-A-0326166 which, for brevity, are considered as herein included for reference.

Good results are obtained by using 2,3-dimethyl-2,3-diphenyl-butane (Interox CCDFB - Peroxyd Chemie); 3,4-dimethyl-3,4-diphenylhexane, etc.

Particularly active cross-linking agents, in the terms defined above, are preferably polyfunctional compounds like the ones described by R. Gächter et al on page 658 of the cited Handbook.

In particular, the following ones have proved to be effective: triallylcyanurate (TAC), triallylisocyanurate (TAIC), diallylterephthalate (DATP), 1,2-cis-polybutadiene (trade name: LITHENE), ethylene glycol dimethylacrylate (EDMA), divinylbenzene, trimethylolpropane trimethacrylate (TRIM), pentaerythritol tetraallylether, m-phenylene-dimaleoimide, etc.

Last, the thermoplastic polymeric and/or copolymeric component consists of the ones, which are usually utilized for the manufacture of broadly used articles affected by self-extinguishment problems.

Compatible polymers and/or copolymers are the ones belonging to the classes of polyolefins, polyesters, polyamides, polycarbonates, styrene resins, polyvinyl chloride, polyurethanes, etc.

Said polymers preferably comprise high and low density polyethylene, polypropylene, polystyrene, polyvinyl chloride, copolymers of the type ethylene-vinyl acetate (EVA), styrene-butadiene, acrylonitrile-styrene-butadiene, ethylene-propylene, ethylene-propylene-diene; polyamides such as nylon 6 and 6.6, etc., polyesthers such as polyethyleneterephthalate, polybutadieneterephthalate, etc.

The presence, in the compositions of the present invention, of metal oxides such as antimony trioxide and/or bismuth oxide, barium borate and zinc borate, etc., up to about 5% by weight, exerts a favorable influence on the flame retarding, however it is not indispensable.

In the formulation of the polymeric self-extinguishing compositions according to the invention there can be present, furthermore, antioxidants, UV-stabilizers and metal stabilizers, lubricants, pigments and nucleating agents as conventionally used, in amounts up to about 3% by weight calculated on the total composition.

The self-extinguishing composition of the present invention can be obtained in the form of granules according to conventional methods, example by mixing the various components in a Banbury mixer, under hot conditions, or by cold mixing, in drum tilters, the powdered components and lastly by granulating, in both cases, the mixture in a single-screw extruder, etc.

The self-extinguishing compositions of the present invention exhibits a few additional characteristics, which are particularly required by the technicians skilled in this field. Of particular interest are the following characteristics:

absence or reduction of the flue gas emission consequent to combustion;

drastic reduction of the flue gas corrosiveness;

thermal stability of the self-extinguishing formulation. This effect is of particular interest and usefulness for some reactive organic bromo-derivatives, which can give rise, at the polymer processing temperature, to decomposition phenomena accompanied by evolvement of acid vapors;

hindrance to the migration of the organic brominated compound in the polymer mass, what is a serious drawback as it lastly affects the surface of the finished articles;

hindrance to polymer dripping during pyrolysis.

EXAMPLES

The present invention will be now described more in detail making reference, in particular, to the following examples, which are given, however, in order to illustrate but not to limit the invention.

Example 1a describes the preparation of the adduct zeolite - inorganic halide, component b) of the composition forming the object of the invention; example 1b describes the use of said adduct according to the invention; example 2 is a comparative test carried out in the absence of component c) and using only zeolite 4A.

The abbreviations have the following meaning:

INTEROX CC DFB: 2,3-dimethyl-2,3-diphenylbutane.

IRGANOX 1035: 2,2'-thiodiethyl-[3-(3,5-di-tert.butyl-4-hydroxyphenyl)propionate].

OLIO MINERALE (mineral oil) FL 64: lubricant.

UL 94: Underwriters Lab. Inc. Method of measure and relative classifications—see R. Gächter et al., page 542 of the cited Handbook; acceptability degree decreasing from V-0 to V-2.

Standard CEI 20-37, part 1: Italian Electrotechnical Committee standard.

MOPLEN FLF 20; IRGANOX 1035; INTEROX CC DFB; MERILIT B; LITHENE PH; PETVIVIFORM; PYRO-CHECK 68 PB; BAYLON V10 H 460; MOPLEN RO/QG-6015 are registered trade names.

EXAMPLE 1 a) Preparation of the adduct component: zeolite 4A—synergic calcium bromide according to the invention.

Into a stainless steel reactor having a 2-liter capacity, equipped with a heating jacket, a stirrer suitable for mixing powdered or pasty materials and a vent pipe for venting out vapors, there were introduced 800 g of zeolite 4A (MERILIT B, produced by Ausidet) containing 21% of water; the reactor temperature was then brought to 350° C. and maintained at this value for 4 hours. After cooling to 190° C., an aqueous solution at 55-60% of calcium bromide was introduced under stirring, the amount thereof being adjusted as a function of the desired final titer of the inorganic bromide (preferably from 80 to 170 ml). The mixture was maintained at 190° C. for a period of time varying from 1 to 4 hours, depending on the added bromide amount and on the desired residual water content in the final product.

b) In a Banbury mixer, a homogeneous mixture was prepared starting from the following products (parts by weight):

100 of polypropylene MOPLEN FLF 20 (Himont), having a density of 0.9 g/ml and a melt flow index, according to ASTM D 1238/L (230° C.), equal to 11 dg/minute;

10 of adduct: zeolite 4A - calcium bromide, prepared as is described under a), (containing 12% of bromine in the state of included bromide associated with zeolite and 5% of water);

20 of hexabromocyclododecane;

0.5 of calcium stearate;

2 of Irganox 1035, phenolic antioxidant (Ciba-Geigy);

0.6 of activator Interox CC DFB (2,3-dimethyl-2,3-diphenylbutane) produced by Peroxyd-Chemie;

1 of triallylisocyanurate (TAIC).

The mixture was granulated by operating in a single-screw extruder, Dolci type, with a length/diameter ratio of the screw (L/D) equal to 22 and a screw diameter of 45 mm, at a temperature of 160°/180° C. After granulation there were prepared, by injection molding, standard specimens for a self-extinguishment evaluation according to method UL 94.

The extinguishment times and the classification (94 V-0) reported on Table 1 are indicative of the excellent self-extinguishing properties of the formulate. On analogous specimens, the determination of the flue gas corrosiveness was carried out by means of combustion and determination of the generated haloid acids, were as follows:

combustion temperature: 20° C./min. up to 300° C. and 600° C;
air flow: 110 ml/min.;
bubbling liquid: 0.1N NaOH.

The results were as follows:
HBr generated up to 300° C.: none;
HBr amount generated from 300° to 600° C.: 10.5 mg/g.

EXAMPLE 2

(Comparative Test)

In a Banbury mixer, a homogeneous mixture composed of the following parts by weight was prepared:
100 of polypropylene (trade-name: MOPLEN FLF 20, produced by Himont) having a density of 0.9 g/ml and a melt flow index according to ASTM D 1238/L (230° C.) equal to 11 dg/min.;
40 of zeolite 4A (trade-name MERLIT B produced by Ausidet);
20 of hexabromocyclododecane;
0.5 of calcium stearate;
0.2 of Irganox 1035 produced by Ciba-Geigy (as phenolic antioxidant).

The mixture was granulated in a Dolci-type single-screw extruder (length/diameter ratio L/D=22; screw diameter=45 mm) at 160° /180° C.

Standard specimens for self-extinguishment determinations according to the specifications of method UL 94 (Underwriters Lab. Inc.) were prepared starting from the granulate by means of injection molding. The results relating to extinguishment times according to the above-cited flame test (see Table 1) proved that the material exhibited poor self-extinguishment characteristics and was classified 94 V-2.

EXAMPLE 3

Operating as in example 1, a mixture having the following composition (parts by weight) was prepared:
100 of polypropylene MOPLEN FLF 20;
35 of the zeolite—$CaBr_2$ adduct analogous with the one of example 1;
5 of barium borate;
20 of hexabromocyclododecane;
0.5 of calcium stearate;
0.2 of antioxidant Irganox 1035;
0.6 of activator Interox CC DFB;
1 of 1,2-cis-polybutadiene (Lithene PH).

Also in this case, the self-extinguishment value measured according to example 1 (Table 1) was corresponding to classification 94 V-0.

EXAMPLE 4

Operating as in example 1, a mixture having the following composition (parts by weight) was prepared:
100 of polypropylene MOPLEN FLF 20;
30 of the zeolite—$CaBr_2$ adduct similar to the one of example 1;
3 of barium borate;
2 of antimony oxide;
20 of hexabromocyclododecane;
0.5 of calcium stearate;
0.2 of antioxidant Irganox 1035;
0.6 of activator Interox CC DFB;
1 of 1,2-cis-polybutadiene (Lithene PH).

Following the modalities described in example 1, a classification 94 V-0 was obtained also in this case (see Table 1).

EXAMPLE 5

Operating as in example 1, a formulate was prepared, which had a composition analogous with the one described in example 1b, with the only exception that there was utilized a zeolite 4A—$CaBr_2$ adduct having a different composition, namely: 15% of bromine in the state of included bromide associated with zeolite and 3% of water, said adduct having been prepared according to example 1a.

Following the same modalities of example 1, a classification 94 V-0 was obtained (see Table 1).

EXAMPLE 6

Operating as in example 1, a formulate having a composition similar to the one described in example 1a was prepared, with the only difference that a different organic bromo-derivative, i.e. decabromodiphenylether, instead of hexabromocyclododecane, was used.

Following the same procedure of example 1, a classification 94 V-0 was obtained (see Table 1).

EXAMPLE 7

Operating as in example 1, the following products were homo-geneously mixed (in parts by weight):
100 of polyethylene terephthalate having an inherent viscosity of 0.85 (PET-VIVIFORM);
40 of the zeolite—$CaBr_2$ adduct having a composition equal to the one of example 1b;
20 of brominated polystyrene (Pyro-check 68 PB by Ferro Corporation);
0.5 of calcium stearate;
0.2 of mineral oil FL 64;
0.2 of antioxidant Irganox 1035;
6 of activator Interox CC DFB;
1 of 1,2-cis-polybutadiene (Lithene PH).

Following the procedure described in example 1, with the exception of the higher extrusion temperature (260° C.), standard specimens for the test according to method UL 94 were obtained: the class was 94 V-0 (see Table 1).

On said specimens, also the flue gas corrosiveness test in accordance to what is described in example 1 was carried out.

The results were as follows:
HBr generated up to 300° C.: none;
HBr amount generated from 300° C. to 600° C.: 9.5 mg/g.

EXAMPLE 8

Operating as in example 1, the following products (parts by weight) were homogeneously mixed:
100 of ethylene-vinyl acetate copolymer (Baylon V10 H460 produced by Bayer AG), having a vinyl acetate content of 8.5%;
40 of zeolite 4A—$CaBr_2$ adduct with a composition like the one of example 5;
40 of hexabromocyclododecane;
1.5 of zinc stearate;

0.2 of mineral oil FL 64;
0.2 of antioxidant Irganox 1035;
0.6 of activator Interox CC DFB;
1.0 of triallylcyanurate.

Following the procedure described in example 1, standard specimens were obtained, which were classified 94 V-0 (see Table 1).

TABLE 1

SELF-EXTINGUISHMENT TESTS ACCORDING TO UL 94

| EXAMPLE | POLYMER | SPECIMEN THICKNESS | AVERAGE EXTINGUISHMENT TIMES (SEC.) | CLASS |
|---|---|---|---|---|
| 1 | PP | 3 | 0-1 | 94 V-0 |
| 2 (REF.) | PP | 3 | 8-15 | 94 V-2 |
| 3 | PP | 3 | 0-1 | 94 V-0 |
| 4 | PP | 3 | 0-1 | 94 V-0 |
| 5 | PP | 3 | 0-0 | 94 V-0 |
| 6 | PP | 3 | 0-0 | 94 V-0 |
| 7 | PET | 3 | 0-0 | 94 V-0 |
| 8 | EVA | 3 | 2-2 | 94 V-0 |

PP = polypropylene;
PET = polyethylene terephthalate;
EVA = ethylene-vinyl acetate.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The above references are hereby incorporated by reference.

We claim:

1. Self-extinguishing polymeric composition comprising, expressed in per cent by weight referred to the total composition:
   a) from 1 to 25% of an organic aliphatic, cycloaliphatic, aromatic halogen-derivative;
   b) from 10 to 40% of an adduct between an inorganic halide and a zeolite;
   c) from 0.5 to 5% of an organic reactive agent suited to modify the polymeric matrix at the combustion temperature, comprising an organic compound capable of generating radicals said temperature, and at a cross-linking agent;
   d) the remaining portion being composed of at least a thermoplastic polymer and/or copolymer.

2. The self-extinguishing polymeric composition according to claim 1, wherein the organic halogen-derivative a) is selected from the organic bromo-derivatives and the paraffinic chloro-derivatives not containing aryloxyl groups.

3. The self-extinguishing polymeric composition according to claim 2, wherein the organic halogen-derivative is selected from hexabromo cyclododecane, tetrabromophthalic anhydride, tetrabromobisphenol, polybromostyrene, hexabromobenzene, melamine hydrobromide, bis-(dibromopropyl-ether) of tetrabromobisphenol A and mixtures thereof.

4. The self-extinguishing polymeric composition according to claim 2, wherein the organic halogen-derivative is selected from hexabromo-cyclododecane, melamine hydrobromide and brominated polystyrene, or mixtures thereof.

5. The self-extinguishing polymeric composition according to claim 1, wherein, except for antimony compounds, the organic halogen-derivative a) is selected from diphenyloxide halogenated derivatives and mixtures thereof and organic bromo-derivatives and paraffinic chloro- derivatives not containing aryloxyl groups.

6. The self-extinguishing polymeric composition according to claim 5, wherein the halogen-derivative is selected from pentabromo-, octabromo-, decabromo-diphenyloxide and chlorobromo-diphenyloxides or mixtures thereof.

7. The self-extinguishing polymeric composition according to claim 1, wherein component a) is present in an amount ranging from 10% to 15% by weight referred to total composition.

8. The self-extinguishing polymeric composition according to claim 1, wherein adduct b) is selected from the ones obtained from a zeolite selected from:

1) synthetic zeolites A, corresponding to formula:

$$Na_2O \cdot Al_2O_3 \cdot 2SiO_2 \cdot 4,5H_2O;$$

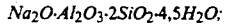

2) synthetic zeolites X, corresponding to formula:

$$Na_2O \cdot Al_2O_3 \cdot 2,4SiO_2 \cdot 6H_2O;$$

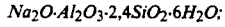

3) synthetic zeolites Y, corresponding to formula:

$$Na_2O \cdot Al_2O_3 \cdot 4,8SiO_2 \cdot 8,9H_2O;$$

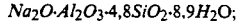

4) hydroxy-sodalite corresponding to formula:

$$Na_2O \cdot Al_2O_3 \cdot 2SiO_2 \cdot 2,5H_2O;$$

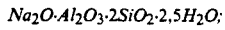

5) natural zeolites selected from phillipsite, clinoptilolite, mordenite, chabazite and mixtures thereof; or from a synthetic molecular sieve having zeolitic structure; and from a bromide or chloride of alkaline or alkaline-earth metals or mixtures thereof.

9. The self-extinguishing polymeric composition according to claim 8, wherein in synthetic zeolites A, X, Y the sodium cation is partially substituted by a cation selected from potassium, calcium, magnesium, barium, zinc and ferrous cation.

10. The self-extinguishing polymeric composition according to claim 8, wherein the zeolite or the molecular sieve consists of approximately 80% by weight, of particles having a granulometric size below 15 microns.

11. The self-extinguishing polymeric composition according to claim 1, wherein the inorganic halide is selected from calcium bromide and magnesium bromide or mixtures thereof.

12. The self-extinguishing polymeric composition according to claim 1, wherein adduct compound b) is composed of:
30-95% of zeolite or molecular sieve;
5-60% of inorganic halide;
0-30% of water,
said amounts being in per cent by weight calculated on the total weight of the adduct.

13. The self-extinguishing polymeric composition according to claim 1 wherein said adduct component b) is contained in an amount ranging from 20% to 30% by weight referred to the total composition.

14. The self-extinguishing polymeric composition according to claim 1 wherein the organic modifier of the polymeric matrix comprises a compound capable of generating radicals at temperatures higher than 250° C. and selected from polysubstituted diphenylethane derivatives and silylbenzopinacol derivatives, associated with a polyfunctional cross-linking agent selected from triallylcyanurate, triallylisocyanurate, diallylterephthalate, 1,2-cis-polybutadiene, ethylenglycol dimethylmethacrylate, divinylbenzene, trimethylolpropane trimethacrylate, pentaerythritol tetraallylether, m-phenylenedimaleoimide.

15. The self-extinguishing polymeric composition according to claim 14, wherein the radical generating compound is selected from 2,3-dimethyl-2,3-diphenylbutane and 3,4-dimethyl-3,4-diphenylhexane.

16. The self-extinguishing polymeric composition according to claim 1 wherein the thermoplastic polymer and/or copolymer is selected from polyolefins, polyesters, polyamides, polycarbonates, styrene resins, polyvinyl chloride or polyurethanes.

17. The self-extinguishing polymeric composition according to claim 1 wherein the thermoplastic polymer and/or copolymer is selected from high density polyethylene and low density polyethylene, polypropylene, polystyrene, polyvinylchloride, ethylene-vinyl acetate, styrene butadiene, acrylonitrile-styrene-butadiene, ethylene-propylene, ethylene-propylene-diene, nylon 6 and 6.6, polyethyleneterephthalate, or polybutyleneterephthalate.

18. The self-extinguishing polymeric composition according to claim 1, comprising, in addition, up to 5% by weight of a compound selected from the antimony and/or bismuth oxides and the barium and zinc borates.

19. The self-extinguishing polymeric composition according to claim 1, comprising, in addition, up to 3% by weight, referred to the total, of antioxidants, UV-radiation stabilizers as well as metal stabilizers, lubricants, pigments and nucleating agents.

20. The self-extinguishing polymeric composition according to claim 4, wherein the synthetic molecular sieve is selected from aluminophosphates and boroaluminosilicates and mixtures thereof.

21. The self-extinguishing polymeric composition according to claim 10, wherein the granulometric size is below 10 micrometers.

* * * * *